United States Patent [19]

Fisco

[11] Patent Number: 5,727,597
[45] Date of Patent: Mar. 17, 1998

[54] POINT REPAIR SYSTEM FOR CONDUITS

[75] Inventor: Benjamin T. Fisco, Harpswell, Me.

[73] Assignee: American Pipeline Supply, Corp., South Harpswell, Me.

[21] Appl. No.: 665,393

[22] Filed: Jun. 18, 1996

Related U.S. Application Data

[62] Division of Ser. No. 263,877, Jun. 22, 1994, Pat. No. 5,628,345.

[51] Int. Cl.⁶ ................................................. F16L 55/18
[52] U.S. Cl. .......................... 138/98; 138/97; 156/287; 405/154
[58] Field of Search .......................... 138/97, 98, 93; 405/154, 150.1; 264/36, 269; 156/94, 294, 287

[56] References Cited

U.S. PATENT DOCUMENTS

| | | |
|---|---|---|
| 4,361,451 | 11/1982 | Renaud . |
| 5,042,532 | 8/1991 | Gilleland . |
| 5,049,003 | 9/1991 | Barton . |
| 5,199,463 | 4/1993 | Lippiatt . |
| 5,203,377 | 4/1993 | Harrington . |
| 5,280,811 | 1/1994 | Catallo et al. . |
| 5,322,653 | 6/1994 | Müller . |
| 5,423,352 | 6/1995 | Sigel . |
| 5,423,630 | 6/1995 | Imoto et al. . |

OTHER PUBLICATIONS

Subterra Limited Brochure: Remote-Line Epoxy-Resin Impregnated Glass Fibre Patch Repair System.
Avanti Internationl (Barry Bros.) Econoline Brochure: The New Short to Medium Length Repair System for Sewers and Drains.

*Primary Examiner*—Patrick F. Brinson
*Attorney, Agent, or Firm*—Renner, Otto, Boisselle & Sklar, P.L.L.

[57] ABSTRACT

A repair system for repairing faults in a conduit. A protective skirt protects the leading edge of a repair sleeve on an inflatable mandrel. One or more straps hold the repair sleeve in position as the mandrel is inserted into the conduit. A release liner facilitates the removal of the mandrel from the repair sleeve after the resin in the repair sleeve has been cured. A calibrated hose within the mandrel provides a substantially constant temperature along the length of the mandrel.

7 Claims, 3 Drawing Sheets

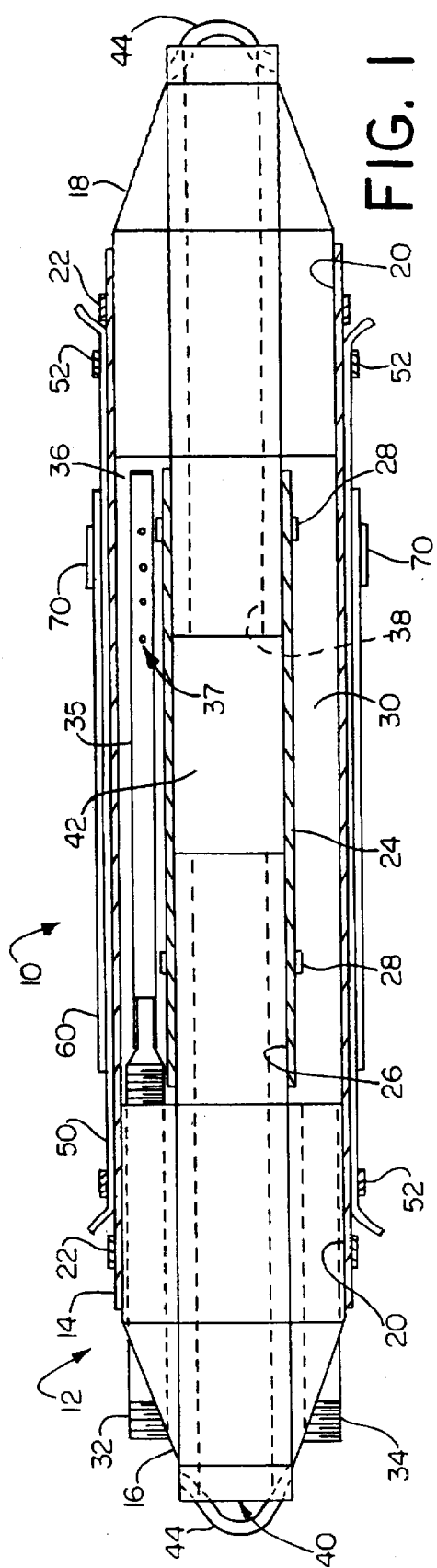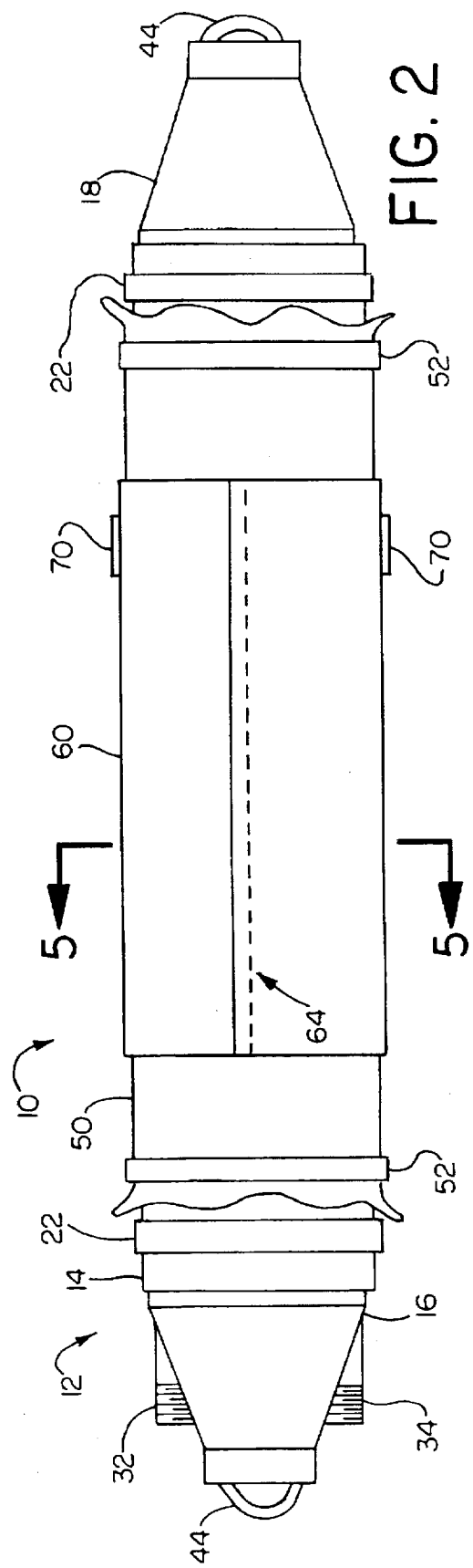

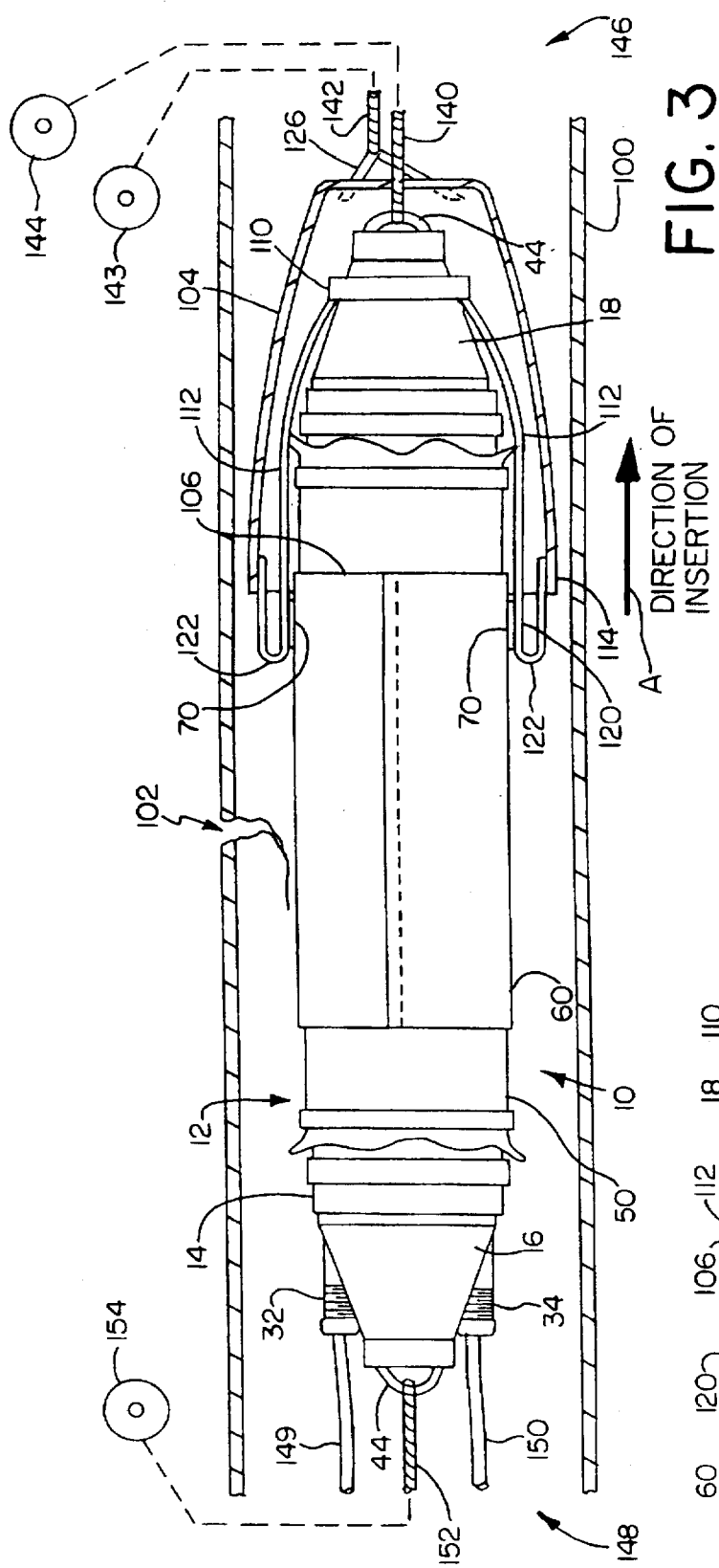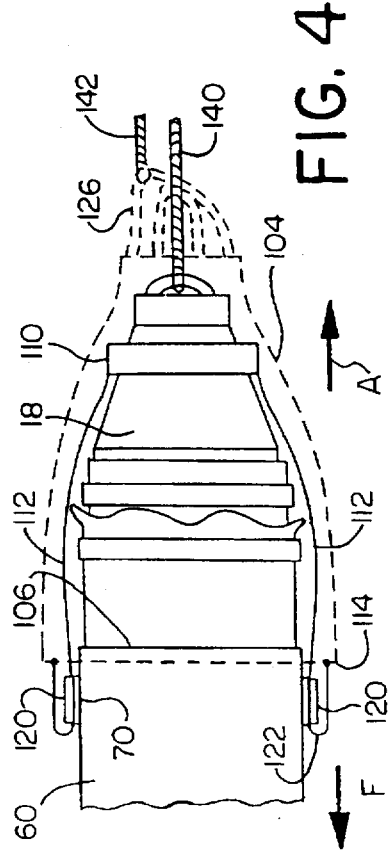

5,727,597

1

POINT REPAIR SYSTEM FOR CONDUITS

This is a division of application Ser. No. 08/263,877, filed Jun. 22, 1994 now U.S. Pat. No. 5,628,345.

TECHNICAL FIELD

The present invention relates to an apparatus and method for repairing faults in a conduit by bonding a repair sleeve to the inner wall of the conduit using an inflatable mandrel. The present invention has particular application in the repair of sewers.

BACKGROUND OF THE INVENTION

The repair of damaged conduits using a resin-impregnated repair material is known in the art. For example, U.S. Pat. Nos. 4,361,451, 5,049,003 and 5,203,377 each describe a system for repairing ruptures or cracks in a conduit such as a sewer conduit. Each of these systems involves a resin-impregnated liner or sleeve which is wrapped around an inflatable core member. The core member and liner are introduced into the conduit and are positioned in proximity to the rupture or crack. The core member is then inflated so as to exert pressure on the liner causing the resin-impregnated liner to become securely engaged with the inner wall of the conduit. The resin is permitted to cure so as to engage the liner to the conduit, and afterwards the core member is deflated and removed from the conduit leaving the liner in place.

There are, however, several drawbacks associated with conventional systems using an inflatable core member. For example, the core member and liner must be inserted into the conduit through an opening and pulled accurately into position with respect to the rupture or crack. During this insertion process, the core member and liner are oftentimes twisted, bent, and dragged against the walls of the opening to the conduit and the conduit itself. Because the repair liner in the past has simply been wrapped around the core member, the abrasive action during the installation process tended to cause the repair liner to shift in position relative to the core member. As a result, it has been difficult to position properly the repair liner in the conduit in relation to the crack or rupture.

Still another drawback associated with conventional systems has been damage caused to the repair liner during insertion of the core member and liner into the conduit. The leading edge of the repair liner as it is inserted into the conduit tends to be raised relative to the core member due to its being wrapped around the outer circumference of the core member. As a result, the leading edge tends to get caught or snagged due to discontinuities in the opening to the conduit and/or in the conduit itself. This causes pulling and possible tearing of the repair liner. Furthermore, it can result in a shifting of the repair liner on the core member.

Yet another drawback in the past has been the lack of a suitable repair liner material that provides both strength and durability. In particular, conventional repair liner materials failed to provide both a lining in the conduit which had the strength of fiberglass or the like yet still tended to resist corrosion caused by the corrosive compositions oftentimes found in sewers.

Moreover, conventional repair systems using an inflatable core member often necessitated a blocking of the conduit for an extended period of time. As a result, bypassing of the portion of conduit being repaired was required. This has been difficult to accomplish, especially with sewers. Other systems, such as the one described in the above-mentioned U.S. Pat. No. 5,203,377, include a coaxial duct in the core member which permits flow through the core member during the repair process.

Still another drawback associated with conventional systems has been the use of a release agent to facilitate removal of the core member from the repair liner following the curing of the resin. In the past, the release agent has been applied to the outer surface of the core member prior to the resin-impregnated repair liner being wrapped around the core member. After the repair liner is installed in the conduit and the core member retrieved, it has been necessary to clean the release agent and any residual resin from the surface of the core member. This requires substantial time and effort thereby undesirably increasing the overall cost of the repair process.

Some systems, such as the system described in U.S. Pat. No. 5,203,377, rely on the eversion of an outer sleeve of the core member to separate the core member from the repair liner. As the core member is removed from the conduit, the outer sleeve is progressively everted and peeled away from the repair liner. A particular drawback associated with this type of system has been that if the resin has not completely cured prior to removal of the core member, the eversion of the outer sleeve tends to peel portions of the repair liner off the wall of the conduit.

Yet another drawback associated with conventional systems relates to the occurrence of uneven curing of the resin in the repair liner. Typically, water under pressure is introduced into the core member in order to inflate the core member. The temperature of the water is adjusted to heat the core member in order to facilitate curing of the resin. Unfortunately, the temperature across the length of the core member has tended to vary significantly. This has resulted in uneven curing of the resin.

In view of the aforementioned shortcomings associated with conventional repair systems, there is a strong need in the art for a repair system in which the repair liner is fixed in position while the core member is inserted into the conduit. There is also a strong need for a repair system in which at least the leading edge of the repair liner is protected from damage during the installation procedure. Furthermore, there is a strong need in the art for a repair liner material which is both strong and durable. In addition, there is a strong need for a repair system which includes a flow through apparatus for permitting flow through during the installation procedure.

It will also be appreciated that there is a strong need in the art for a repair system which does not require clean up of a release agent and/or residual resin from the core member following installation. Moreover, there is a strong need in the art for a repair system which includes a core member having circulation means for forming a substantially constant temperature regime over the entire length of the core member.

SUMMARY OF THE INVENTION

The present invention seeks to provide a repair system for conduits which overcomes the aforementioned shortcomings found in conventional repair systems.

In accordance with one aspect of the present invention, a system for repairing a fault in a conduit, especially a sewer conduit, is provided including an inflatable mandrel insertable into the conduit proximate the fault, a repair sleeve wrapped about the mandrel and sufficiently large to cover the fault; and a fastener which fixes the repair sleeve in position relative to the mandrel during the insertion of the mandrel into the conduit, the fastener being remotely releasable prior to inflation of the mandrel.

According to another aspect of the present invention, a system for repairing a fault in a conduit is provided including an inflatable mandrel insertable into the conduit proximate the fault, a repair sleeve wrapped about the mandrel and sufficiently large to cover the fault, the repair sleeve having a leading edge which is inserted first into said conduit, and protective skirt which covers at least the leading edge during the insertion of the mandrel into the conduit.

According to still another aspect of the invention, a repair material is provided for use as a repair sleeve for repairing a fault in a conduit, the repair material including a first layer impregnable by resin to engage the repair material to an inner circumferential surface of the conduit, a second layer impregnable by resin to form a resin rich surface to be exposed to contents of the conduit, and a third layer disposed between the first and second layers, the third layer comprising at least one of a synthetic material and a glass material.

In accordance with yet another aspect of the present, a system for repairing a fault in a conduit is provided including an inflatable mandrel insertable into the conduit proximate the fault, a repair sleeve wrapped about the mandrel and sufficiently large to cover the fault, the repair sleeve being pressed into engagement with an inner circumferential surface of the conduit upon the mandrel being inflated, and a flexible high strength flow through passage within the mandrel which permits flow through the conduit during the insertion of the mandrel into the conduit and the inflation of the mandrel.

According to even yet another aspect of the invention, a system for repairing a fault in a conduit is provided including an inflatable mandrel insertable into the conduit proximate the fault, a release liner placed about the mandrel, a resin impregnated repair sleeve positioned over the release liner and sufficiently large to cover the fault, the repair sleeve being pressed into engagement with an inner circumferential surface of the conduit upon the mandrel being inflated, and wherein the release liner facilitates release of the mandrel from the repair sleeve after the resin has cured.

In accordance with still another aspect of the invention, a system for repairing a fault in a conduit is provided including an inflatable mandrel which can be positioned in the conduit proximate the fault, the mandrel including a leading end and a trailing end, an input connection and an output connection both located proximate the trailing end of the mandrel for inputting and outputting, respectively, an inflating medium in the mandrel, and a hose located within the mandrel having one end connected to the input connection for receiving the inflating medium input to the mandrel, the opposite end of the hose being open and located proximate the leading end of the mandrel for routing the inflating medium from the input connection towards the leading end of the mandrel.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the drawings:

FIG. 1 is a partial cross-sectional view of a point repair system in accordance with the present invention;

FIG. 2 is a plan view of the point repair system in accordance with the present invention;

FIG. 3 is a partial cross-sectional view of the point repair system inside a conduit in accordance with the present invention;

FIG. 4 is an enlarged view of a portion of the point repair system of FIG. 3 in accordance with the present invention;

DESCRIPTION OF THE PREFERRED EMBODIMENTS

Figure 5:
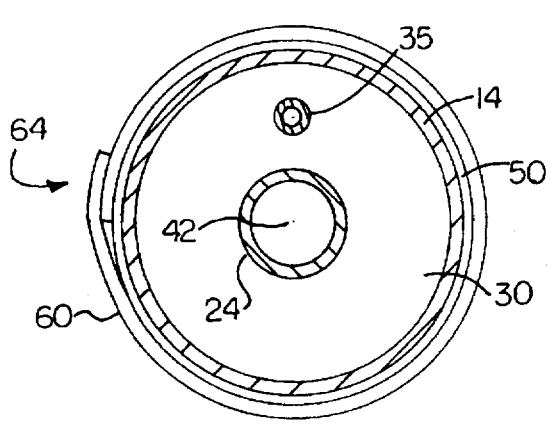
FIG. 5 is a cross-sectional view of the point repair system in accordance with the present invention taken along the lines 5—5 shown in FIG. 2.

The present invention will now be described with reference to the drawings in which like reference labels are used to refer to like elements throughout.

Referring initially to FIG. 1, a point repair system generally designated 10 is shown in accordance with the present invention. The point repair system finds special application in the repair of sewer conduits, but may also be used to advantage in connection with other conduits, such as water mains or pipes in industrial or chemical plants.

The point repair system 10 includes a mandrel 12 having an elongate inflatable bladder 14 made of rubber or some other inflatable material, which may or may not be reinforced. In the preferred embodiment, the bladder 14 consists of a section of ¼ inch thick flexible rubber hose having an outside diameter which is smaller than the diameter of the inner wall of the conduit to be repaired. End plugs 16 and 18 each have an outer neck portion 20 having a diameter approximately equal to the inside diameter of the bladder 14. The respective ends of the bladder 14 are engaged around the outer neck portion 20 of the corresponding plugs 16 and 18 and are secured with band clamps 22 to form a pressure tight seal therebetween.

The mandrel 12 further includes a flexible flow through passage 24 preferably consisting of a flexible hose made of rubber or the like. The flow through passage 24 is aligned coaxially with the bladder 14 and has an outside diameter smaller than the inside diameter of the bladder 14. The inside diameter of the flow through passage 24 is approximately the same as the outside diameter of an inner neck portion 26 on each end plug 16 and 18. The respective ends of the flow through passage 24 are engaged around the inner neck portion 26 of the corresponding plugs 16 and 18 and are secured with band clamps 28 to form a pressure tight seal therebetween. The flow through passage 24 preferably is made of a high strength flexible material such as a segment of 3-inch or 4-inch diameter heavy duty hose which is commercially available. The flow through passage 24 is preferably strong enough to withstand the high pressures which are encountered when the bladder is inflated.

The combination of the bladder 14, the flow through passage 24 and the end plugs 16 and 18 define an annular shaped pressure tight region 30 into which an inflation medium is introduced to cause the bladder 14 to expand or inflate radially outward. More specifically, the end plug 16 includes inlet 32 comprising a pipe or the like for introducing a pressurized inflation medium such as pressurized hot water into the region 30. An outlet 34 similarly comprising a pipe or the like serves as an outlet for the inflation medium from the region 30.

In a preferred embodiment, a calibration hose 35 is attached to the inlet 32 within the region 30 which routes the pressurized inflation medium received at the inlet 32 towards the opposite end of the mandrel 12 (e.g., towards the end plug 18). An end 36 of the hose 35 is open so as to introduce the inflation medium directly into the region 30 and create a circulation pattern of the inflation medium within the region 30 that flows substantially from the end of the mandrel 12 near the end plug 18 back towards the outlet 34 in the end plug 16. In this manner, the heat provided by a heated inflation medium introduced at the inlet 32 is distributed more uniformly through the bladder 14 as compared to conventional repair systems. This allows for an even and thorough cure of the resin in the resin-impregnated repair sleeve (discussed below) as will be appreciated. Moreover, in place of and/or in addition to the opening at end 36 of the hose 35, the hose 35 may include one or more openings 37 along the length of the hose 35. The size and/or placement of the opening(s) 37 can be calibrated to provide any desired circulation path or paths of the inflation medium as will be appreciated. In another embodiment of the invention, moreover, multiple calibration hoses 35 attached to the inlet 32 are included within the region 30 with one or more openings for further controlling the circulation paths.

The end plugs 16 and 18 each include bore holes 38 which extend through the entire length of the end plug along the axis of the inner and outer neck portions. The diameter of the bore holes 38 is preferably only slightly smaller than the inside diameter of the flow through passage 24 so as to create a flow through passage 40 through the entire length of the mandrel 12 substantially equal to the diameter of the flow through passage 24. As a result, the mandrel 12 does not totally block the flow of material (such as sewage) through the conduit during a repair procedure. Instead, the material will flow through the respective bore holes 38 and the flow through passage 24 via flow through region 42 as shown. Because the flow through passage 24 is made of a high strength yet flexible material such as a heavy duty hose, the flow through passage 24 remains flexible during insertion of the mandrel 12 into the conduit while still resisting collapse under normal temperatures and pressures exerted during the repair process. Furthermore, the mandrel 12 can be made any length and still go around bends in sewers or the like.

The end plugs 16 and 18 are preferably made of a high strength material such as fiberglass or metal. Each end plug 16 and 18 includes a handle portion 44 to which a line can be secured for pulling the mandrel 12 through the conduit as is discussed more fully below with respect to FIG. 3.

Around the outer circumference of the bladder 14 is a release liner 50. The release liner 50 is secured at both ends of the mandrel 12 by band clamps 52. The release liner can be either tightly or loosely fitted around the bladder 14 and serves to keep the outer surface of the bladder 14 clean from the resin in the resin-impregnated repair sleeve discussed below. In addition, the release liner 50 serves to facilitate total release of the mandrel 12 from the resin-impregnated repair sleeve after curing. The release liner 50 is preferably made of a non-adherent material such as a polyethylene, Teflon, polyvinylchloride, vinyl or any other material which does not adhere to the cured resin. The release liner material can be in sheet or tubular form. A release agent can be applied to the outer surface of the release liner 50, although such a release agent is not generally necessary. In either case, the release liner 50 facilitates the release of the mandrel 12 from the repair sleeve after curing.

Consequently, it is not necessary to buff or clean any release agents and/or residual resin from the surface of the bladder 14 following installation. Any release agent and/or any residual resin will remain only on the release liner 50. The release liner 50 can be removed easily from the mandrel 12 following installation by removing band clamps 52. The release liner 50 can be cleaned much more easily than the mandrel 12 itself. After cleaning, the release liner 50 can be reused. Alternatively, the release liner 50 simply can be thrown away in view of its relatively low cost. The same mandrel 12 can be used for multiple installations.

Continuing to refer to FIG. 1, a resin-impregnated repair sleeve 60 is positioned around the outer circumference of the release liner 50. The repair sleeve 60 is preferably made of a repair material such as that described below in connection with FIG. 6. On the other hand, a conventional repair material such as that disclosed in the above-identified patents can also be used without necessarily departing from the scope of the present invention. According to the exemplary embodiment, the repair sleeve 60 is made of a rectangular piece of repair material having a length sufficiently long to cover any faults in the conduit in the axial direction and a width which is at least as long as the circumference of the inner wall of the conduit. The repair material forming the repair sleeve 60 is wrapped around the circumference of the release liner 50 as is shown in FIG. 5. Because the mandrel 12 in its deflated state has a diameter less than that of the conduit, the repair material overlaps itself to form a seam 64 (FIGS. 2 and 5).

Prior to insertion of the mandrel 12 into the conduit, a temporary adhesive material is used in the area of the seam 64 to hold the repair material in a tubular shape around the mandrel 12. After the mandrel 12 has been inserted into the conduit to be repaired and the bladder 14 is inflated, the expanding bladder 14 will cause the releasable seam 64 to break allowing the repair sleeve 60 to expand to the diameter of the conduit. Such temporary adhesive can be, for example, a low strength epoxy The end of the mandrel 12 including end plug 18 is referred to herein as the leading end of the mandrel, and the end including end plug 16 is referred to as the trailing end of the mandrel. This is because the leading end of the mandrel 12 including the end plug 18 is typically inserted first into the conduit and is pulled by a conventional winch and cable attached to the handle portion 44 of the end plug 18 through the conduit towards the fault to be repaired. Attached to the repair sleeve 60 towards the leading end of the mandrel 12 is one or more fasteners 70 with a high relative shear strength in the direction of insertion of the mandrel into the conduit and a low relative peel strength such as a temporary adhesive or Velcro-type material, e.g., a hook-and-loop type material. In the preferred embodiment, each fastener 70 includes either the hook portion or the loop portion of a Velcro-type material. Each fastener 70 is adhered to the surface of the repair sleeve 60 using an epoxy or the like, with either the hook portion or the loop portion facing away from the surface of the repair sleeve. In another embodiment, the fastener 70 may be another type of mechanical fastener or an adhesive of other type fastening mechanism.

As will be described more fully below in connection with FIGS. 3 and 4, the fasteners 70 are used for attaching the repair sleeve 60 to one or more straps which hold the repair sleeve in position on the mandrel 12 during the insertion of the mandrel into the conduit. In addition, the fasteners 70 are used to attach a skirt which covers the leading end of the mandrel 12 in order to protect the leading edge of the repair sleeve 60 during insertion of the mandrel into the conduit.

Referring briefly to FIG. 2, the point repair system 10 of FIG. 1 is shown in plan view. As can be seen, the mandrel 12 includes the end plugs 16 and 18 and the bladder 14. The release liner 50 is wrapped around the bladder 14 and is secured by the band clamps 52. The repair sleeve 60 is wrapped around the release liner 50 and secured at seam 64.

Turning now to FIG. 3, the point repair system 10 is shown inside a conduit 100 having a fault 102. The point repair system 10 also includes a protective skirt 104 (shown in cross-section) which is fitted over the leading end of the mandrel 12. The protective skirt 104 substantially covers the end plug 18 and at least the leading edge 106 of the repair sleeve 60. The protective skirt 104 is preferably made of a high strength material such as nylon, plastic sheeting or tubing, rubber, reinforced fabric, etc., and is preferably waterproof so as not to absorb water or other liquids which may be present in the conduit 100. As is described in more detail below, the skirt 104 serves to protect the leading edge 106 of the repair sleeve 60 and prevents the leading edge from getting caught or snagged during insertion into the conduit and movement therethrough.

A collar 110 is loosely fitted over a cone section of the end plug 18 as shown. Fixedly attached to the collar 110 (by a band clamp or other attachment means) are respective ends of nylon straps 112. The other end of each strap 112 is fixedly attached to the bottom of the skirt 104 at 114. According to the preferred embodiment, each strap 112 includes a fastener section 120 of Velcro-type material designed to mate with the Velcro-type fasteners 70 attached to the repair sleeve 60 as discussed above. The section 120 on each strap 112 is located thereon such that the distance between the collar 110 and the corresponding fastener 70 is substantially equal to the distance between the collar and the section 120. This will insure that the repair sleeve 60 does not shift on the mandrel 12 during insertion as is discussed below with respect to FIG. 4.

Prior to the mandrel 12 being inserted into the conduit 100, the collar 110 is positioned around or attached to the cone shaped end of end plug 18 as shown. The protective skirt 104 is then slipped over the end of the mandrel 12 and the straps 112 are positioned along the side of the mandrel 12 such that the Velcro-type section 120 on the side of the straps 112 closest the mandrel 12 are attached to the corresponding Velcro-type fastener 70. The straps 112 are therefore folded back upon themselves as shown at 122 with the ends of the straps fixedly connected to the bottom of the skirt 104 as described above. A strap handle 126 is included at the top of the skirt 104 for attaching a line used during the repair procedure as will be described below.

According to the repair procedure of the present invention, the conduit 100 is cleaned initially using conventional methods so as to form a clean inner wall to which the repair sleeve can be engaged. The mandrel 12 is prepared outside the conduit 100 by attaching the release liner 50 to the bladder 14. This is done by wrapping the release liner 50 around the bladder 14 and securing it thereto using band clamps 52. The repair sleeve 60 is impregnated with a thermoset or catalytic set resin such as a polyamide epoxy resin, a polyester resin, a vinyl ester resin, etc., which can be cured-in-place. The length of the repair sleeve 60 should conform to the length of the fault(s) in the conduit plus a foot or so extra on each side. The repair sleeve 60 is wrapped around the release liner 50 and temporarily tacked at seam 64. The collar 110 and skirt 104 are slipped over the leading end of the mandrel 12 and the straps fastened to fasteners 70 as described above.

Winch lines 140 and 142 connected to winches 143 and 144, respectively, are inserted through the conduit 100 from an opening 146 (downstream from the fault 102) to an opening 148 (upstream from the fault 102) in which the repair mandrel 12 is to be inserted. The winch line 140 is secured to the handle portion 44 and winch line 142 is secured to the strap handle 126 on the skirt 104. A pressurized inflation medium such as hot water is provided to the mandrel 12 via a hose 149 having one end connected to the inlet 32 and the other end connected to a pressurized inflation medium source (not shown) from the side of the opening 148. A hose 150 having one end connected to the outlet 34 and the other end connected to the pressurized inflation medium source return via opening 148. The pressurized inflation medium delivered to the mandrel 12 is controlled so as not to inflate the bladder 14 prior to the mandrel 12 being positioned proximate the fault 102. Preferably there is no flow of the inflation medium such as hot water to the mandrel 12 until the mandrel is in position within the conduit. An optional line 152 attached to winch 154 is connected to the handle portion 44 of end plug 16 from the side of the opening 148 into which the mandrel 12 is to be inserted.

The mandrel 12 is then inserted into the conduit 100, leading end first, through the opening 148. Winch 144 is used to pull on winch line 140 so that the mandrel 12 is pulled through the conduit in the direction of insertion noted by arrow A to the point of the fault 102 as shown in FIG. 3. As the repair mandrel 12 is pulled through the conduit 100 towards the fault 102, line 142 is kept relatively loose so as not to exert any significant pulling force on the skirt 104 in the direction of insertion. As is explained more fully below, the combination of the collar 110 and the skirt straps 112 guarantee that the repair sleeve 60 remains in the proper position on the mandrel 12 as the mandrel is pulled through the conduit. As a result, winch measurements guarantee that the repair sleeve 60 is properly aligned with the crack or fault. After the repair sleeve 60 and mandrel 12 are pulled into position via line 140, the winch 144 is stopped.

Winch 143 is then used to pull on line 142 and the strap handle 126 in the direction of insertion. As is explained more fully below in relation to FIG. 4, the pulling on the strap handle 126 of the skirt 104 by line 142 causes the ends of straps 112 which are attached at the bottom of the skirt 104 to be pulled away from the fasteners 70 in the direction of insertion. Because the straps 112 are folded back on themselves at 122 as is noted above, the hooks/loops on sections 120 of the straps are peeled back and away from the loops/hooks on fasteners 70 of the repair sleeve 60. Thus, the straps 112 will separate from the repair sleeve 60 and as the winch 143 continues to pull on line 142 the skirt 104 will slip off the leading end of the repair mandrel 12 in the same direction as the direction of insertion. Since the other ends of the straps 112 are connected to the collar 110, the collar will be pulled in the direction of insertion and will slip off the end of the end plug 18. The protective skirt 104 and collar 110 are then pulled sufficiently far away from the leading end of the mandrel 12 so that the repair sleeve 60 will be fully exposed to engage in intimate contact with the inner wall of the conduit 100.

After the skirt 104 has been removed in the above-described manner, the mandrel 12 is inflated via the inlet 32 and outlet 34. The inflated mandrel 12 causes the resin-impregnated repair sleeve 60 to be pressed into firm engagement with the inner wall of the conduit 100. Heat may be applied to the mandrel 12 via the pressurized inflation medium in order to accelerate the curing process of the resin. As a result of the calibration hose 35 discussed above (FIG. 1), the circulation of hot water or another inflation medium can be controlled so as to create a constant temperature regime along the entire length of the repair sleeve 60. In this manner, more even curing of the resin is possible as compared to conventional methods.

Pressure and heat is maintained in the mandrel 12 according to a predetermined schedule based on the particular resin being used and until the repair sleeve 60 has reached a suitable hardness and the resin is determined to be cured. Upon completion of the curing, the mandrel 12 is deflated via the inlet 32 and outlet 34. Winches 143 and 144 are then used to pull the mandrel 12 and protective skirt 104 through the conduit 100 to the opening 146 where the mandrel is removed from the conduit. Alternatively, winch 154 is used to pull the mandrel 12 in its deflated condition back through opening 148 into which the mandrel was originally inserted. The protective skirt 104 in this case is still preferably, although not necessarily, pulled through the opening 146 in order to be removed.

As was discussed above, the release liner 50 facilitates the total release of the mandrel 12 from the repair sleeve 60 following curing. After the mandrel 12 has been removed from the conduit 100, the release liner 50 can be cleaned and reused. In the alternative, the release liner 50 can simply be removed and thrown away. Either way, clean up of the mandrel 12 is fast and simple.

Referring now to FIG. 4, further details on the protective skirt 104 (shown in phantom) will be provided. In particular, it is noted that the protective skirt is long enough to cover at least the leading edge 106 of the repair sleeve 60. Thus, as the mandrel 12 is inserted and pulled through the conduit via line 140 in the direction of arrow A, the skirt 104 will tend to protect the leading edge 106 against any abrasions which may lie in the path of the mandrel 12. As a result, the leading edge 106 is less likely to be torn and or shifted during the insertion process.

Furthermore, as the mandrel 12 is inserted and pulled through the conduit by line 140 in the direction of insertion, it will be appreciated that there may be frictional forces F and/or other forces which tend to pull on the repair sleeve 60 in a direction opposite that of the direction of insertion. However, the straps 112 in turn will tend to fix the position of the repair sleeve 60 and prevent movement in a direction opposite the direction of insertion. Specifically, any forces F pulling on the repair sleeve 60 will present a shear type force in the Velcro-type connections between fasteners 70 and sections 120. As is known, the hook and loop type connection is very strong with respect to shear type forces therebetween. Therefore, the fasteners 70 and 120 provide a very strong connection which will not separate during insertion. The collar 110 is sized so as not to slide further down the cone shaped end of the end plug 18 so that the other ends of the straps 112 are fixed and will not move in a direction opposite to the direction of insertion. Thus, straps 112 will securely hold the repair sleeve 60 in place during insertion.

A characteristic of the Velcro-type connection between fasteners 70 and sections 120 is that the hook-and-loop type connection can be easily separated when either the hook or loop material is peeled back away from the other. The present invention takes advantage of this characteristic by folding the straps 112 back upon themselves as previously described. When the skirt 104 is pulled in the direction of insertion by line 142, the folded-back straps tend to peel the sections 120 away from the fasteners 70. Therefore, when it is time to remove the skirt 104 from the mandrel 12 after the mandrel has been inserted into the conduit, the skirt 104 can be separated easily from the repair sleeve 60.

In a different embodiment, the hook-and-loop type connection between the straps 112 and the repair sleeve 60 can be replaced with a temporary adhesive which fastens the straps 112 to the repair sleeve 60. The temporary adhesive, or any other type fastener having a relatively high shear strength in the direction of insertion of the mandrel into the conduit and a relatively low peel strength, enables the repair sleeve 60 to be held securely during installation while allowing the skirt 104 to be separated easily therefrom by a peeling action.

Referring briefly to FIG. 5, a cross-sectional view of the repair mandrel 12 taken along lines 5—5 of FIG. 2 is shown. In particular, the flow through passage 24 is positioned concentrically within the bladder 14. The release liner 50 is positioned around the bladder 14, and the repair sleeve 60 is wrapped around the release liner 50.

Figure 6:
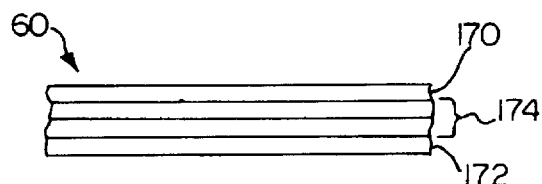
FIG. 6 is a cross-sectional view of a repair sleeve material in accordance with the present invention.

FIG. 6 is a cross-sectional view of the material used for the repair sleeve 60 in accordance with the preferred embodiment of the invention. The material preferably is a laminate which includes a first layer 170 which faces the inner wall of the conduit. The first layer 170 is impregnable by resin such that it will be adhered directly to the inner wall or inner circumferential surface of the conduit. A second layer 172 faces the release liner 50 and is intended to serve as the new inner wall of the conduit following the repair installation. The second layer 172 also is impregnable by resin to form a resin rich surface. The first and second layers 170 and 172 are preferably made of a thin veil of corrosion resistant cloth, such as felt cloth, having a high resin perpendicular absorption rate and a low resin parallel flow rate.

A third layer 174 is disposed between said first and second layers. The third layer 174 preferably is made of a high strength material such as a synthetic material such as nylon and/or a glass material such as fiberglass. The third layer 174 may in fact consist of multiple layers of high strength material. The third layer 174 serves to increase the strength of the repair sleeve 60 as compared to the cloth layer(s) alone. It will be appreciated that the first layer 170 provides a resin rich bond between the repair sleeve 60 and the inner wall of the conduit. The second layer 172, on the other hand, creates a resin rich layer which, when cured, serves to protect the high strength third layer 174 from corrosive elements which may normally flow through the conduit. For example, in the case of an underground sewage conduit the resin rich layer formed by the second layer 172 using polyamide epoxy resin, when cured, will be chemically resistant and withstand internal exposure to domestic sewage gasses including hydrogen sulfide, carbon monoxide, carbon dioxide, methane, dilute sulfuric acid, external exposure to soil bacteria and any chemical attack which may be due to materials in the surrounding ground. The third layer 174 will be protected from such corrosive materials, and at the same time will serve as a high strength liner to any faults in the conduit.

Figure 7:
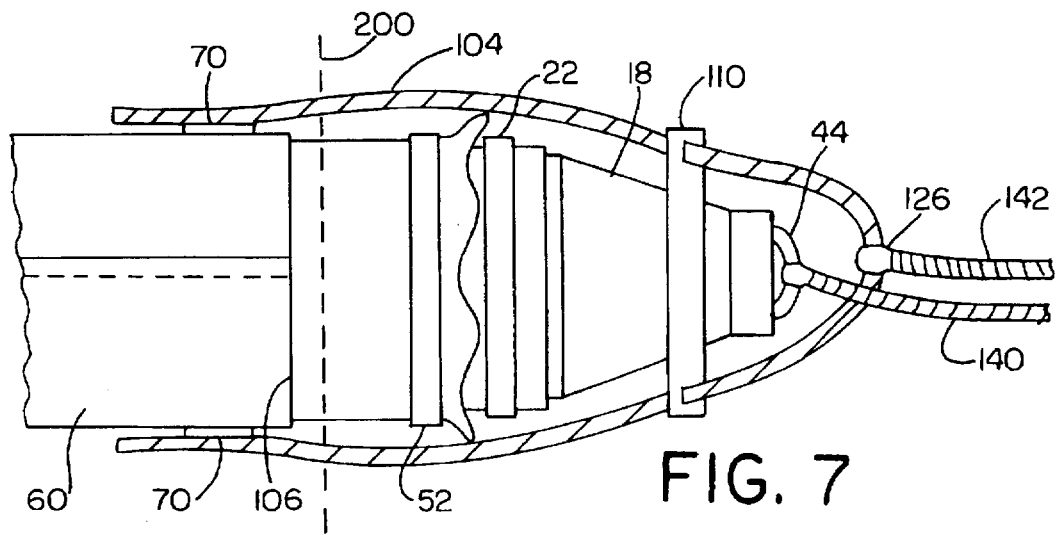
FIG. 7 is a partial cross-sectional view of the point repair system in accordance with another embodiment of the present invention.

FIG. 7 shows another embodiment of the invention in which a modified protective skirt 104 is used both to prevent the repair sleeve 60 from shifting and to protect the leading end of the mandrel and sleeve. The protective skirt 104 (shown in cross section) is connected at one end to the perimeter of the collar 110. The protective skirt 104 is connected at the other end to the outer surface of the repair sleeve 60 by fasteners 70 comprising an adhesive or the like. In this particular embodiment, the mandrel 12 is inserted into the conduit as in the previous example. However, the mandrel 12 is inflated and the resin in the repair sleeve is cured prior to removing the protective skirt 104. As a result, the end of the protective skirt 104 is bonded between the conduit and the sleeve 60. Next, winch 143 pulls on line 142 which pulls on collar 110 via strap handle 126, the strap handle 126 being attached to the collar 110 in this embodiment. The winch 143 pulls with sufficient force to cause the protective skirt 104 to tear or otherwise completely separate in the area identified by dashed line 200. Thus, the majority of the protective skirt is released and can be removed by the winch 143. The small portion of the skirt 104 which remains within the conduit will have little or no affect on the operation of the conduit. The protective skirt 104 may include perforations or the like in the area identified by dashed line 200 to facilitate separation of the protection skirt 104 during removal. If desirable, a tool such as a root cutter may be used to remove any excess material left in the conduit from the protective skirt 104. A suitable material for the protective skirt would be 7 millimeter thick polyethylene tubing.

Figure 8:
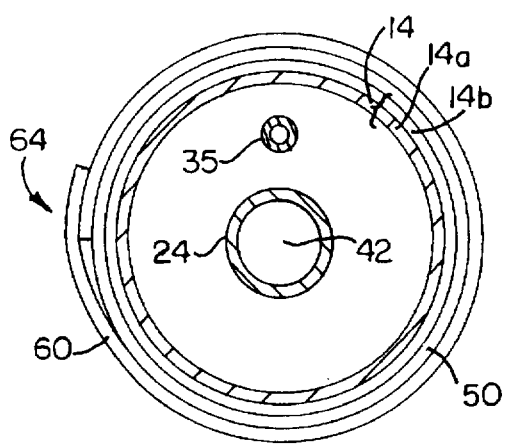
FIG. 8 is a cross-sectional view of the point repair system in accordance with yet another embodiment of the present invention.

Turning now to FIG. 8, yet another aspect of the invention is shown relating to a modified mandrel design. In this embodiment, the inflatable bladder 14 consists of a composite material made up of layers 14a and 14b. Layer 14a is made of rubber or some other material which tends to stretch as it is inflated by the inflation medium. Layer 14b, on the other hand, surrounds layer 14a and serves as an inflation limiter with respect to the amount layer 14a can expand during inflation. More specifically, layer 14b is made of a flexible material such as canvas, reinforced nylon or cloth, etc., which has a high tensile strength and low percentage of elongation. Thus, when the mandrel 12 is inflated the layer 14b will inflate only to a prescribed limit determined by the diameter of the layer 14b. The layer 14b will surround the layer 14a such that the layer 14a will not expand beyond a certain point. This avoids the possibility of the layer 14a bursting due to overinflation. This is particularly important in conduits having large holes through which a conventional rubber bladder may protrude out and continue to expand until the bladder bursts.

The diameter of the layer 14b is selected to be approximately equal to the diameter of the conduit to be repaired. When the mandrel 12 is in its deflated state, the layer 14b will fit somewhat loosely about layer 14a. As the mandrel is inflated, the layers 14a and 14b will inflate until limited by layer 14b as will be appreciated.

Although the invention has been shown and described with respect to certain preferred embodiments, it is obvious that equivalents and modifications will occur to others skilled in the art upon the reading and understanding of the specification. For example, it will be appreciated that although two straps 112 are shown in the exemplary embodiment, any number of straps can be used without departing from the scope to the invention. Also, although winches are used primarily for pulling the mandrel and/or skirt in the conduit, it will be appreciated that various other automatic or manual means can be used without departing from the scope of the invention.

Furthermore, although the present invention is discussed primarily in the context of using a resin impregnated repair sleeve, it will be appreciated that the present invention has application with other types of repair sleeves used to repair conduits. For example, polyethylene or polyvinylchloride piping can serve as the repair sleeve around the mandrel 12 whereby the mandrel 12 inflates to engage the piping to the conduit. Whether or not resin or some other material is utilized to fixedly engage the repair sleeve to the conduit will be a function of the particular repair needs as will be appreciated.

In addition, the invention is described in the preferred embodiments as using a collar and straps to secure the protective skirt and repair sleeve to the mandrel. It will be appreciated, however, that other means for performing the same functions can be utilized without departing from the scope of the invention. For example, hooks can be used in place of the collar for attaching to the leading end of the mandrel. Similarly, in place of the straps some other attachment means can be used such as cables, a continuous sheet-like material, etc., for attaching the collar to the repair sleeve.

The present invention includes all such equivalents and modifications, and is limited only by the scope of the following claims.

What is claimed is:

1. An apparatus for repairing a fault in a conduit, comprising:

an inflatable mandrel insertable into said conduit proximate said fault;

a repair sleeve wrapped about said mandrel and sufficiently large to cover said fault, said repair sleeve having a leading edge which is inserted first into said conduit; and a protective skirt which covers at least said leading edge during the insertion of said mandrel into said conduit to a location adjacent said fault, said protective skirt comprising means operative for removing said protective skirt from said mandrel after insertion of the mandrel to the location adjacent said fault.

2. The apparatus of claim 1, said mandrel having a leading end and a trailing end for insertion into said conduit, said protective skirt comprising at least one strap having one end operatively attached to said leading end and a fastening section proximate another end releasably attached to said repair sleeve.

3. The apparatus of claim 2, said fastening section of said strap being attached to said repair sleeve with a fastener and said one end being operatively attached to said leading end such that a pulling force exerted on said one end of said strap from an opening of said conduit results in said fastening section being released from said repair sleeve.

4. The apparatus of claim 3, wherein said one end of said strap is attached to a collar on said leading end of said mandrel, said protective skirt being attached to a line extending to said opening of said conduit and being removable from said leading end as a result of a force exerted on said line.

5. The apparatus of claim 1, wherein said means for removing includes a line extending to an opening in said conduit and cooperative with said protective skirt whereby said protective skirt is separated from said mandrel upon a force being exerted on said line.

6. A method for repairing a fault in a conduit, comprising the steps of:

wrapping a repair sleeve about an inflatable mandrel, said repair sleeve having a leading edge which is to be inserted first into said conduit;

placing a protective skirt on said mandrel to cover at least said leading edge during the insertion of said mandrel into said conduit;

inserting said mandrel into said conduit with said protective skirt protecting said leading edge to a location adjacent said fault; and removing said protective skirt from said mandrel after insertion of the mandrel to the location adjacent said fault.

7. A method for repairing a fault in a conduit, comprising the steps of:

wrapping a repair sleeve about an inflatable mandrel, said repair sleeve having a leading edge which is to be inserted first into said conduit;

placing a protective skirt on said mandrel to cover at least said leading edge during the insertion of said mandrel into said conduit;

inserting said mandrel into said conduit whereby said protective skirt protects said leading edge;

inflating said mandrel to fixedly engage said repair sleeve to said conduit; and removing at least part of said protective skirt from said conduit following said inflating step.

* * * * *